Sept. 16, 1952     E. B. HALES     2,610,789
TRIANGLE SOLVER
Filed Jan. 21, 1948     2 SHEETS—SHEET 1
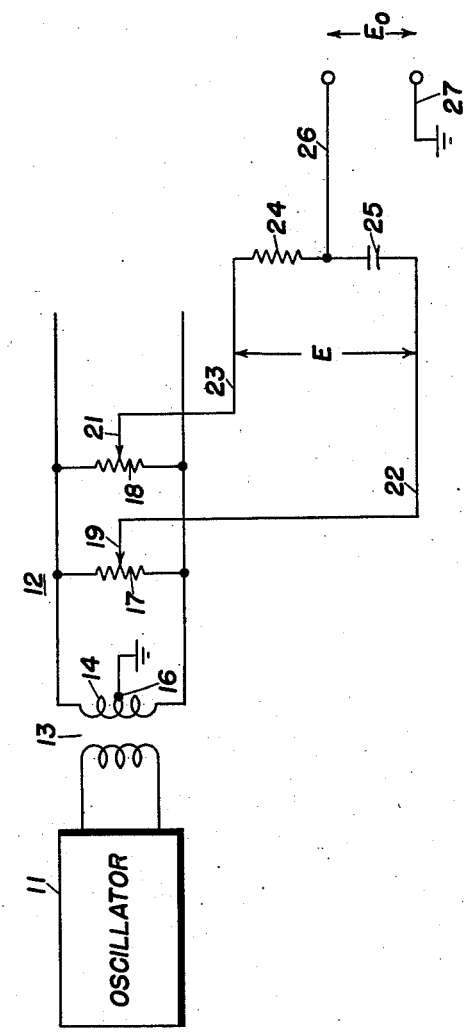
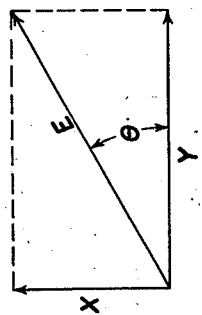
Inventor
EVERETT B. HALES
By H. L. Mackey
Attorney Inventor
EVERETT B. HALES
H. L. Mackey
Attorney Patented Sept. 16, 1952

2,610,789

UNITED STATES PATENT OFFICE 2,610,789

TRIANGLE SOLVER

Everett B. Hales, Mount Kisco, N. Y., assignor to General Precision Laboratory Incorporated, a corporation of New York Application January 21, 1948, Serial No. 3,652

2 Claims. (Cl. 235—61)

This invention relates to a triangle solver. More specifically the invention comprises a system in which two alternating current voltages of equal frequencies but different amplitudes, selected as representative of rectangular coordinates, that is, amplitudes in X and Y directions are combined to produce a single voltage whose amplitude is proportional to the vector sum of the amplitudes of the selected voltages and whose phase is proportional to the phase angle of that vector sum. In other words, the system of the present invention converts voltages representative of rectangular coordinates to a single voltage of corresponding polar coordinates.

In various training devices, target simulators and the like it is desired to indicate synthetically the continuously varying positions of a number of targets or other objects with respect to a selected reference point which may also vary in position. This requires that a number of controls be provided which may be so actuated that the position of all of the targets may be continuously varied in accordance with some preconceived plan. Such continuous variations in position are most conveniently resolved into components of motion in north-south and east-west directions since by such resolution changes in position may be accomplished by mere addition or subtraction of components of motion in these directions rather than requiring complicated vector solutions as would be the case if the targets were located and followed by changes of range and azimuth.

It is simpler, therefore, to base the operation of the controlling means on a system of rectangular coordinates and to provide sets of controls which may be actuated to produce voltages whose amplitudes are representative of the positions of the targets in X and Y directions. When, however, such voltages are to be utilized on a plan position indicator type of display, the rectangular coordinate voltages must first be converted to polar coordinate voltages. It is a function of the present invention to provide a simple yet accurate means for performing this conversion.

Various systems for accomplishing this purpose have been devised in the past but they suffer from the disadvantage that when a plurality of such devices are connected to a single source of energy to simulate a plurality of targets, actuation of any one such device tends to unbalance the system and affect the settings of the remainder.

In the system of the instant invention conversion from rectangular to polar coordinates is accomplished by relatively simple and inexpensive components and numbers of such systems may be operated from a single source of energy without the objectionable interaction hitherto obtained.

While as indicated above, the invention is particularly adapted for use in training devices and target simulators, it will also be appreciated that the simple system of the present invention finds numerous applications wherever it is desired to convert rectangular coordinates to polar coordinates and to obtain an indication of the magnitude and angle of the hypotenuse of a right triangle knowing the magnitude of the adjacent sides or to vectorially add voltages representative of values in X and Y directions.

The invention will be more readily understood from the following description considered in connection with the attached drawings, in which:

Figure 1 is a simplified schematic diagram illustrative of the system of the invention.

Figure 2 is a diagram illustrating the vector relationship of the various voltages applied to the circuit of Fig. 1.

Figure 3:
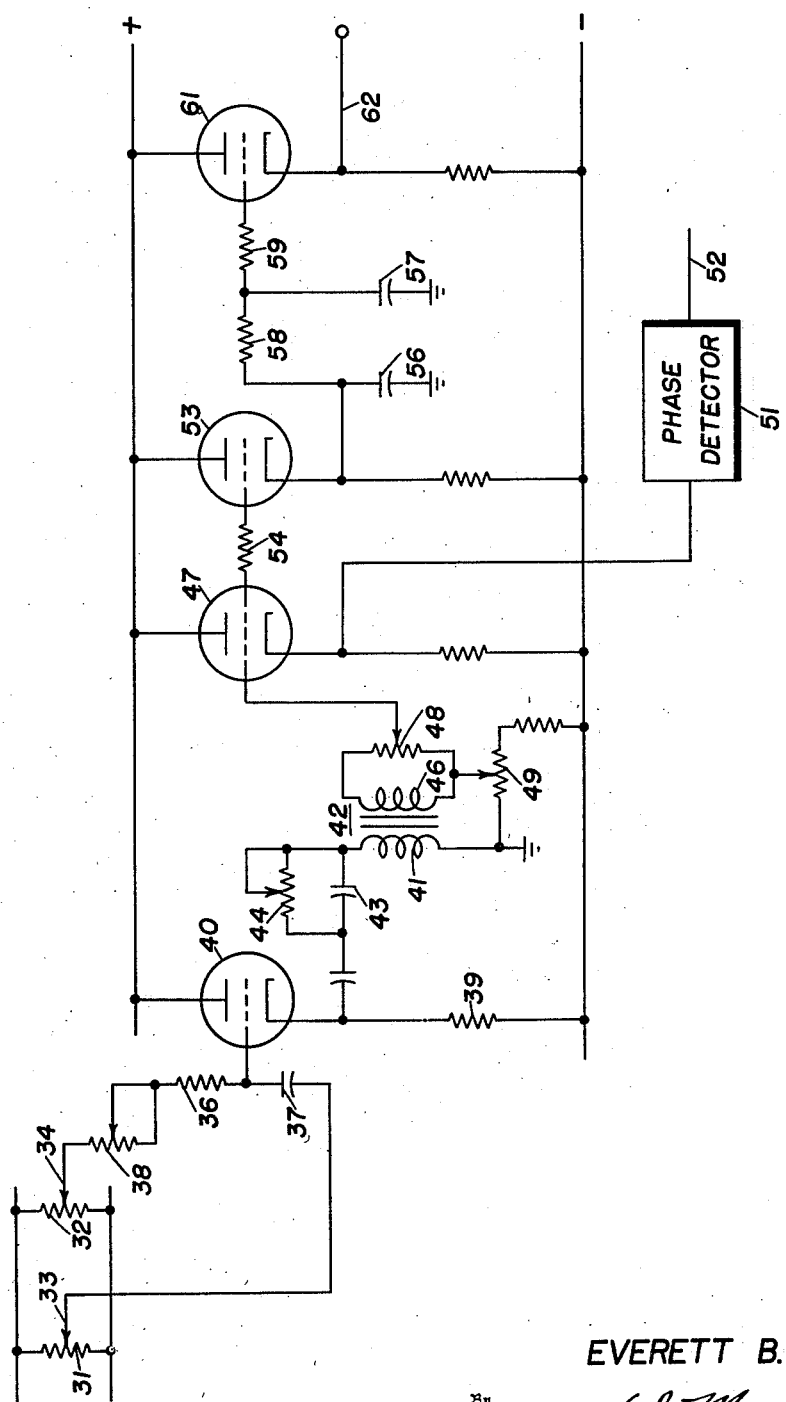
Figure 3 is a schematic diagram of the circuit of Fig. 1 having in addition, means by which separate outputs proportional to phase and magnitude may be obtained.

Referring particularly to Fig. 1, alternating current energy is generated by an oscillator 11 which may be operated at any desired and convenient frequency. A voltage supply circuit 12 is connected to receive energy generated by the oscillator 11 through the medium of a transformer 13, the secondary 14 of which is grounded at its mid-point 16. By thus grounding the mid-point 16 of the secondary 14, circuit 12 is balanced and opposite sides thereof are at voltages with respect to ground which are equal in magnitude but opposite in phase or sign.

The voltages which are chosen to be representative of voltages in X and Y directions are obtained from potentiometers 17 and 18 connected in parallel to the voltage supply circuit 12. Movable contacts 19 and 21 may be adjusted throughout the range of these potentiometers so that the voltages impressed on conductors 22 and 23 may be varied from a maximum of one phase to a maximum of the opposite phase.

The voltage existing between conductors 22 and 23 is therefore representative of the vector sum of the voltages impressed on these conductors by manipulation of the movable contacts 19 and 21. Referring to the diagram of Fig. 2 and considering the voltage impressed on contact 21 and hence conductor 23 as represented by the vector X and the voltage impressed on contact 19 and hence the conductor 22 as represented by the vector Y, the voltage existing between the two conductors will be representative of the vector sum of these voltages having an amplitude E and a phase angle $\theta$.

The conductors 22 and 23 are connected to opposite ends of a series network consisting of a resistance 24 and a condenser 25 and a voltage $E_0$ obtained between a conductor 26 connected to the juncture of resistance 24 and condenser 25 and a conductor 27 connected to ground. By proper adjustment and selection of values for the resistance 24 and capacity 25 in relation to each other and the frequency of the voltage supply source 11, the voltage $E_0$ can be made to have an amplitude which is proportional to the voltage E, i. e., the vector sum of the selected voltages X and Y and to have a phase proportional to $\theta$ the phase angle of the vector sum of voltages X and Y. That is to say, a voltage $E_0$ is obtained whose polar coordinates are representative of the rectangular coordinates of the voltages X and Y and by proper calibration the desired conversion from rectangular to polar coordinates is realized.

The manner in which this conversion is accomplished, the values which must necessarily be imparted to the circuit components and the fixed relationship of the voltage $E_0$ to the vector sum of voltages X and Y, i. e., the voltage E may be mathematically expressed as follows:

The voltage $E_0$ which is the voltage of conductor 26 as respects ground is equal to the algebraic sum of the voltage Y and the voltage existing across condenser 25. The voltage existing across condenser 25 is in turn a function of the potential existing between conductors 22 and 23, namely, voltages X and Y and the reactance of resistance 24 and condenser 25. The voltage $E_0$ may, therefore, be expressed by the following expression:

$$E_0 = Y + (X-Y)\frac{\frac{1}{j\omega C}}{R + \frac{1}{j\omega C}} \quad (1)$$

where $E_0$, Y and X have the values as above, R is the resistance of resistance 24, C the capacity of condenser 25, $\omega$ the frequency of the supply source in radians per second, i. e., $\omega = 2\pi f$ and $j$ has the value of $\sqrt{-1}$ as used in complex notations.

Multiplying the numerator and denominator of the fraction of Equation 1 by the value $j\omega C$ Equation 1 may be reduced to the form:

$$E_0 = Y + \frac{(X-Y)}{1 + j\omega CR} \quad (2)$$

Selecting values of resistance and capacity such that $\omega CR = 1$ and substituting in Equation 2 it follows that:

$$E_0 = Y + \frac{X-Y}{1+j1} = \frac{Y + jY + X - Y}{1+j1} \quad (3)$$

which may be further simplified to:

$$E_0 = \frac{X + jY}{1+j1} \quad (4)$$

Multiplying the numerator and denominator by the value $(1-j1)$ Equation 4 becomes:

$$E_0 = \frac{(1-j1)(X+jY)}{2} = \frac{X + jY - jX + Y}{2} \quad (5)$$

or in more convenient complex notational form:

$$E_0 = \frac{X + Y + j(Y-X)}{2} \quad (6)$$

Equation 6 may be also expressed in algebraic form rather than by complex notation whence Equation 6 becomes:

$$E_0 = \frac{1}{2}\sqrt{(X+Y)^2 + (Y-X)^2} \quad (7)$$

which may be expanded to:

$$E_0 = \frac{1}{2}\sqrt{X^2 + 2XY + Y^2 + Y^2 - 2XY + X^2} \quad (8)$$

which when like terms are combined simplifies to:

$$E_0 = \frac{1}{2}\sqrt{2(X^2+Y^2)} = \frac{\sqrt{2}}{2}\sqrt{X^2+Y^2} \quad (9)$$

From the geometry of Fig. 2 it is apparent that:

$$E = \sqrt{X^2 + Y^2} \quad (10)$$

E being the vector sum of X and Y.

Substituting the value E as determined by Equation 10 for its equivalent $\sqrt{X^2+Y^2}$ in Equation 9 it follows that $$E_0 = \frac{E}{\sqrt{2}} = .707E \quad (11)$$

It is apparent therefore that the amplitude of the voltage $E_0$ is directly proportional to the magnitude of the voltage E, that is, the vector sum of voltages X and Y.

Considering now the relationship of the phase angles of the voltage $E_0$ and the vector E of Fig. 2 and denoting the phase angle of $E_0$ by the notation $\phi$ it is apparent from the vector relationship of Equation 6 that:

$$\tan \phi = \frac{Y-X}{Y+X} \quad (12)$$

$X+Y$ being the real term of Equation 6 and hence the adjacent side $Y-X$ is the imaginary term and hence the opposite side of the vector triangle whose included angle is $\phi$.

Dividing numerator and denominator by the value X, Equation 12 may be converted to the form:

$$\tan \phi = \frac{\frac{Y}{X} - 1}{\frac{Y}{X} + 1} \quad (13)$$

From the geometry of Fig. 2 it is readily apparent that the phase angle of the vector E, namely $\theta$, may be expressed by the equation:

$$\tan \theta = \frac{Y}{X} \quad (14)$$

hence substituting the value $$\frac{Y}{X}$$

as determined by Equation 14 in Equation 13 there is obtained the relationship:

$$\frac{\tan \theta - 1}{\tan \theta + 1} = \tan \phi \quad (15)$$

By simple trigonometric conversion $\tan \phi$ as determined by Equation 15 becomes:

$$\tan \phi = -\cot(\theta + 45°) = -\tan(45° - \theta) \quad (16)$$

and $$\phi = -(45° - \theta) = \theta - 45° \quad (17)$$

It is therefore evident that the phase angle of the voltage $E_0$ bears a direct relation to the phase angle of the vector E as well as a direct relationship as regards amplitude and that by proper calibration an output voltage is obtained which in amplitude and phase reproduces in polar coordinates, input voltages expressed in rectangular coordinates. In other words, selected input voltages whose amplitudes represent the two vectors displaced 90° with respect to each other may be combined in a single phase shifting network to yield an output whose magnitude is representative of the vector sum of the input voltages and whose phase is representative of the phase angle of such vector sum.

Likewise, since the reactance of the network consisting of resistance 24 and condenser 25 may be made high a number of conversion networks may be connected to operate from a single source through a series of potentiometers similar to those of 17 and 18 as depicted in Fig. 1 without affecting the balance of the supply system at any adjustment of the input voltages. That is to say, since the current flowing through the network consisting of resistance 24 and condenser 25 may be made negligible even when the contacts 19 and 21 are adjusted to extreme positions in their ranges insufficient current is drawn by the network 24 and 25 to affect the balance of the two halves of secondary 14 and hence the operation of any duplicate networks which may be connected to the same source of supply through potentiometers similar to 17 and 18.

As an example only, of values which have been found to give desirable results a resistance of approximately 230,000 ohms and a condenser having a capacity of 680 micromicrofarads have been found to operate satisfactorily when supplied by 1000 cycle alternating current source.

Similar results may be obtained in a circuit wherein an inductance is substituted for the condenser 25. In a practical circuit, however, it is more advisable to use a condenser since it is difficult to obtain an inductance of suitable value which at the same time has negligible resistance.

In utilizing a voltage such as produced by the system of Fig. 1 in which two variables are expressed in phase and amplitude, it may be desirable to provide separate outputs one of which is proportional to the phase variation and the other of which is proportional to the amplitude variation.

The schematic diagram of Fig. 3 illustrates one means by which this separation of variables may be obtained.

The X and Y voltages representative of rectangular coordinates are obtained by use of potentiometers 31 and 32 connected to an alternating supply source of the same nature as illustrated in Fig. 1. The selected potentials derived from potentiometers 31 and 32 by means of movable contacts 33 and 34 are applied to the opposite ends of a phase shifting network similar to the phase shifting network 24 and 25 of Fig. 1 except that in addition to a fixed resistance 36 and condenser 37 and additional adjustable resistance 38 is included in this series circuit so that these elements may be accurately adjusted to satisfy the requirement $\omega CR = 1$.

The juncture of resistance 36 and condenser 37 is connected to the grid of a cathode follower 40 the cathode of which is connected to the negative side of a power supply through a relatively large unbypassed cathode resistance 39 and hence the voltage developed by the network 36, 37 and 38 which is of varying phase and amplitude as heretofore described is applied to the input of the cathode follower 40.

The output of this cathode follower is connected to the primary 41 of a step-up transformer 42. Included in the output of the cathode follower 40 and in series with the primary 41, a phase shifting network is provided consisting of condenser 43 and potentiometer 44. Values are so chosen that adjustment of potentiometer 44 will provide a phase adjustment of from 0 to 10° across condenser 43 and by this means the slight differences in phase shift of the various transformers may be compensated by suitable adjustment of potentiometer 44.

The secondary 46 of transformer 42 is connected to the input of a second cathode follower 47 through the medium of a potenticmeter 48 constituting an amplitude adjusting means.

When the potentiometer 44 is adjusted to adjust the phase and so compensate for the phase shift of the transformers in circuit such adjustment also changes the amplitude and therefore potentiometer 48 must be adjusted to compensate for the change in amplitude resulting from adjustment of the phase shift. Relatively large changes in adjustment of potentiometer 48 will result in some change in phase so that a second adjustment of potentiometer 44 followed by a second adjustment of potentiometer 48 will frequently be necessary. However, as a small adjustment of potentiometer 48 causes no appreciable change in phase it will rarely be necessary to repeat this process a second time.

The grid of the cathode follower 47 is connected to the negative terminal of the power supply source through a potentiometer 49 which permits proper zero adjustment of the system. That is, the potentiometer 49 may be so adjusted that at an input of zero amplitude, the output is likewise zero.

The output of cathode follower 47 is impressed on a phase detector which may also include a constant current amplifier and the output derived from this circuit by the conductor 52 contains the information as to phase of the voltage derived from the network 36, 37 and 38.

The signal derived from the potentiometer 48 is also applied to the grid of a peak rectifier 53 through an isolating resistance 54 and the output of this rectifier includes a filter network consisting of condensers 56 and 57 and resistances 58 and 59 so that a direct current voltage is obtained whose value is representative of the amplitude of the voltage applied to the input of the cathode follower 40.

This potential is applied to the input of a cathode follower 61 and the output thereof impressed on conductor 62 contains the information as to amplitude of the voltage derived from the network 36, 37 and 38 thus two separate outputs are provided, one containing phase information and the other containing amplitude information.

What is claimed is:

1. In a system of the character described, an alternating current circuit including a transformer, the secondary of which is grounded at its midpoint, first and second potentiometers connected in shunt to said alternating current circuit, an independently movable contact for each of said potentiometers, a resistor and a condenser connected in series between said movable contacts, said resistor and condenser having relative values of resistance and capacity as determined by the expression $\omega CR = 1$ where C is the capacity of the condenser, R the resistance of the resistor and $\omega$ the frequency of the alternating current circuit in radians, and an output circuit connected between the juncture of said resistor and condenser and ground.

2. In a system of the character described, an alternating current source, a circuit connected to said source having its midpoint grounded, a pair of potentiometers connected across said circuit each of said potentiometers including an independently movable contact, a resistor and a condenser connected in series between said movable contacts, said resistor and condenser having such values that the capacitive reactance of said condenser is equal to the resistance of said resistor at the frequency of said alternating current source, an output circuit connected between the juncture of said resistor and condenser and ground, said output circuit including a phase detector producing as an output thereof a constant amplitude alternating potential whose phase is proportional to the phase of the quadrature vector sum of the potentials impressed on said movable contacts, and a peak rectifier producing as an output a direct current potential, the magnitude of which is proportional to the magnitude of the quadrature vector sum of the potentials impressed on said movable contacts.

EVERETT B. HALES.

REFERENCES CITED

The following references are of record in the file of this patent:

UNITED STATES PATENTS

| Number | Name | Date |
|---|---|---|
| 2,241,615 | Plebanski | May 13, 1941 |
| 2,385,334 | Davey | Sept. 25, 1948 |
| 2,447,517 | Manson | Aug. 24, 1948 |

OTHER REFERENCES

Radio Engineers Handbook, Terman, published 1943, McGraw-Hill Co., New York, N. Y., 1019 pages (page 949, Figure 56a).